United States Patent
Rokkan et al.

(10) Patent No.: US 9,784,873 B2
(45) Date of Patent: *Oct. 10, 2017

(54) FULLY CONTAINERIZED DEPLOYMENT SYSTEM FOR AUTONOMOUS SEISMIC NODES

(71) Applicant: Seabed Geosolutions B.V., Leidschendam (NL)

(72) Inventors: Arne Henning Rokkan, Olsvik (NO); Richard Edward Henman, Horsham (GB); Leif Johan Larsen, Alversund (NO); Johan Fredrik Næs, Trondheim (NO); Mariann Ervik, Trondheim (NO); Ole-Fredrik Semb, Tolvsrod (NO)

(73) Assignee: SEABED GEOSOLUTIONS B.V., Leidschendam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/821,492

(22) Filed: Aug. 7, 2015

(65) Prior Publication Data

US 2016/0041285 A1  Feb. 11, 2016

Related U.S. Application Data

(60) Provisional application No. 62/034,620, filed on Aug. 7, 2014.

(51) Int. Cl.
*G01V 1/38* (2006.01)
*F16L 1/20* (2006.01)
(Continued)

(52) U.S. Cl.
CPC .......... *G01V 1/3852* (2013.01); *B65G 67/60* (2013.01); *F16L 1/14* (2013.01); *F16L 1/20* (2013.01); *F16L 1/235* (2013.01); *G01V 1/3843* (2013.01)

(58) Field of Classification Search
CPC .... G01V 1/3843; G01V 1/3852; B63B 25/28; B63B 2025/285
(Continued)

(56) References Cited

U.S. PATENT DOCUMENTS 6,024,344 A  2/2000  Buckley
6,044,786 A  4/2000  Dudley
(Continued)

FOREIGN PATENT DOCUMENTS

EP  1870733 A3  9/2009
EP  2492713 A1  8/2012
(Continued)

*Primary Examiner* — Benjamin Fiorello
*Assistant Examiner* — Stacy Warren
(74) *Attorney, Agent, or Firm* — Park, Vaughan, Fleming & Dowler LLP; Shane A. Nelson (57) ABSTRACT

Containerized handling, deployment, and retrieval systems for deploying and retrieving a plurality of autonomous seismic nodes from the back deck of a marine vessel are presented. The handling system may comprise a deployment system and a node storage and service system fully contained within a plurality of CSC approved ISO containers. Each of the components of the handling system may be located in a CSC approved ISO container for storage, operation, and transport. In one embodiment, the node deployment system is configured to retrieve and deploy autonomous seismic nodes from the back deck of a vessel. In one embodiment, the node storage and service system is configured to transfer nodes to and from the node deployment system for storage and servicing.

20 Claims, 6 Drawing Sheets

(51) Int. Cl.
*B65G 67/60* (2006.01)
*F16L 1/14* (2006.01)
*F16L 1/235* (2006.01)

(58) Field of Classification Search
USPC .................. 405/158, 166, 173; 367/15, 20
See application file for complete search history.

(56) References Cited

U.S. PATENT DOCUMENTS

| | | | |
|---|---|---|---|
| 6,657,921 | B1 | 12/2003 | Ambs |
| 6,975,560 | B2 | 12/2005 | Berg |
| 7,254,093 | B2 | 8/2007 | Ray |
| 7,260,024 | B2 | 8/2007 | Goujon |
| 7,286,442 | B2 | 10/2007 | Ray et al. |
| 7,310,287 | B2 | 12/2007 | Ray |
| 7,561,493 | B2 | 7/2009 | Ray |
| 7,602,667 | B2 | 10/2009 | Thompson |
| 7,646,670 | B2 | 1/2010 | Maxwell |
| 7,649,803 | B2 | 1/2010 | Ray |
| 7,668,047 | B2 | 2/2010 | Ray |
| 7,724,607 | B2 | 5/2010 | Ray |
| 7,778,114 | B2 | 8/2010 | Goujon |
| 7,804,737 | B2 | 9/2010 | Thompson |
| 7,883,292 | B2 | 2/2011 | Thompson |
| 7,929,378 | B2 | 4/2011 | Gros |
| 7,933,165 | B2 | 4/2011 | Thompson |
| 7,986,589 | B2 | 7/2011 | Ray |
| 7,990,803 | B2 | 8/2011 | Ray |
| 8,021,080 | B2 | 9/2011 | Frivik |
| 8,050,140 | B2 | 11/2011 | Ray |
| 8,087,848 | B2 | 1/2012 | Thompson |
| 8,127,706 | B2 | 3/2012 | Thompson |
| 8,149,647 | B2 | 4/2012 | Borgen |
| 8,172,480 | B2 | 5/2012 | Thompson |
| 8,226,328 | B2 | 7/2012 | Thompson |
| 8,228,761 | B2 | 7/2012 | Ray |
| 8,328,467 | B2 | 12/2012 | Thompson |
| 8,427,900 | B2 | 4/2013 | Fleure |
| 8,619,495 | B2 | 12/2013 | Thompson |
| 8,675,446 | B2 | 3/2014 | Gateman |
| 8,801,328 | B2 | 8/2014 | Thompson |
| 8,864,416 | B2 | 10/2014 | Thompson |
| 8,879,362 | B2 | 11/2014 | Ray |
| 8,942,059 | B2 | 1/2015 | Furuhaug |
| 9,170,344 | B2 | 10/2015 | Lindberg |
| 2004/0068373 | A1* | 4/2004 | Goujon ............... G01V 1/16 702/1 |
| 2005/0052951 | A1* | 3/2005 | Ray ............... G01V 1/247 367/188 |
| 2008/0267009 | A1* | 10/2008 | Frivik ............... G01V 1/3843 367/15 |
| 2014/0198607 | A1 | 7/2014 | Etienne |

FOREIGN PATENT DOCUMENTS

| | | |
|---|---|---|
| WO | 2005074426 A2 | 8/2005 |
| WO | 2006/041438 A1 | 4/2006 |
| WO | 2011/139159 A1 | 11/2011 |
| WO | 2014/027892 A1 | 2/2014 |
| WO | 2014/084741 A1 | 6/2014 |
| WO | 2014/185787 A1 | 11/2014 |

\* cited by examiner

FULLY CONTAINERIZED DEPLOYMENT SYSTEM FOR AUTONOMOUS SEISMIC NODES

PRIORITY

This application claims priority to U.S. provisional patent application No. 62/034,620, filed on Aug. 7, 2014, the entire content of which is incorporated herein by reference.

BACKGROUND OF THE INVENTION

Field of the Invention

This invention relates to marine seismic systems and more particularly relates to a deployment and retrieval system for a plurality of autonomous seismic nodes that is fully containerized in a plurality of ISO certified containers.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time.

Once the data recorders are retrieved, the data is downloaded and batteries may be replaced or recharged in preparation of the next deployment One known node storage, deployment, and retrieval system is disclosed in U.S. Pat. No. 7,883,292 to Thompson, et al. ("Thompson '292"), and is incorporated herein by reference. Thompson et al. discloses a method and apparatus for storing, deploying and retrieving a plurality of seismic devices, and discloses attaching the node to the deployment line by using a rope, tether, chain, or other cable such as a lanyard that is tied or otherwise fastened to each node and to a node attachment point on the deployment line. U.S. Pat. No. 7,990,803 to Ray et al. ("Ray") discloses a method for attaching an ocean bottom node to a deployment cable and deploying that node into the water. U.S. Pat. No. 6,024,344 to Buckley, et al. ("Buckley") also involves attaching seismic nodes to the deployment line. Buckley teaches that each node may be connected to a wire that is then connected to the deployment line though a separate connector. This connecting wire approach is cumbersome because the wires can get tangled or knotted, and the seismic nodes and related wiring can become snagged or tangled with structures or debris in the water or on the sea floor or on the marine vessel. U.S. Pat. No. 8,427,900 to Fleure, et al. ("Fleure") and U.S. Pat. No. 8,675,446 to Gateman, et al. ("Gateman") each disclose a deployment line with integral node casings or housings for receiving seismic nodes or data recorders. One problem with integration of the casings with the deployment line is that the deployment line becomes difficult to manage and store. The integrated casings make the line difficult to wind onto spools or otherwise store manageably. In these embodiments, the node casings remain attached directly in-line with the cable, and therefore, this is a difficult and complex operation to separate the electronics sensor package from the node casings. The referenced shortcomings are not intended to be exhaustive, but rather are among many that tend to impair the effectiveness of previously known techniques in seafloor deployment systems; however, those mentioned here are sufficient to demonstrate that the methodologies appearing in the art have not been satisfactory and that a significant need exists for the systems, apparatuses, and techniques described and claimed in this disclosure.

As mentioned above, to perform a seismic survey that deploys and retrieves a large number of autonomous seismic nodes, those nodes must be deployed and retrieved from a marine surface vessel (e.g., a supply vessel). This requires both a supply vessel and a deployment system on the supply vessel. Both have significant limitations.

Existing node deployment systems use large, specially made deployment equipment, machines, and modules/containers that take a long time to install on a standard supply vessel or must have their own dedicated supply vessels. The installation of such equipment may take weeks or months to install properly and may require a dedicated and/or specifically designed vessel to operate such equipment. Such a supply vessel is difficult to find, expensive to rent and/or to buy, and may require significant lead-time to purchase, lease, and/or build. In some instances, the vessels are purposely re-built to integrate the deployment system into the structure of the vessel. When the vessel is not in use and/or is between jobs, rather than removing the deployment equipment and re-installing when the next seismic survey is to be performed, the equipment is typically left on the vessel, and the operator is forced to pay the daily rental rates of the vessel. If a dedicated supply vessel is used, it takes significant time and money to transport that dedicated supply vessel to an intended survey destination around the world. Such systems are costly, time consuming, and ineffective.

A primary issue with existing node deployment systems is actually transporting the node deployment system to the intended survey site and/or port to equip a supply vessel with the node deployment system. Transportation is a highly regulated industry, and existing node deployment systems are not capable of being easily transported. In some instances, the node deployment systems (or portions thereof) are so cumbersome to transport that the intended supply vessel is moved from one location in the world to the node the deployment system's storage or fabrication facility to have the deployment system installed at the storage facility, and then to transit the supply vessel to the intended destination site of the survey. This is a costly and time-consuming process. Further, if the deployment system requires non-standardized shipping methods (which is a requirement of all existing node deployment systems), seismic surveys can be seasonal and at times the transmit times between surveys can be substantial, such as transits from Europe to Asia, Asia to the eastern United States or Europe, and the western United States to Europe.

A container ship is a standard type of cargo ship that carries all of its payload in a container, commonly called shipping containers. A container ship is the predominant method of commercial freight sea transport and carries most seagoing non-bulk cargo around the world. Containerization (e.g., the shipping of goods via standard containers in a standard shipping container) significantly reduces shipping time and costs, and much like the airline industry, has a set schedule of times, destinations, and routes for ports and routes all around the world. However, the transportation industry has regulated container ships and sea transportation, and only ISO certified containers may be used on a container ship. The ISO regulations require that the ISO certified container meets certain size, strength, and durability requirements. An ISO container has a maximum weight limitation. This standardization allows rapid movement, placement, and fastening of containers to the container ships. Not all containers are shipping containers, and not all shipping containers are ISO certified containers. While non-ISO certified containers may be able to transport via air, truck, or train, typically only ISO certified containers are capable of being transported via a container ship.

All current node deployment systems cannot be fully transported to an intended seismic survey location with normal or standardized methods of transportation, particularly as to the use of container ships. Some of the existing node deployment systems use equipment and machines that must be transported by themselves (if too large) and/or installed directly on a dedicated transport vessel. The transportation of such equipment to an intended destination may take months to complete, is very costly, and requires specific transportation vessels that are not easily obtainable. Other existing deployment systems may partially transport such equipment in specially made modules/containers or even some of the equipment in standardized shipping containers, but not all of the equipment can be or is transported via such standardized shipping containers. Further, once the equipment reaches the vessel, even if partially transported in standardized containers, much of the equipment must be removed from the containers and separately installed to the vessel, which takes weeks and/or months to install. Such transportation procedures are costly, time consuming, and ineffective.

Thus, if a node deployment system wants to be transported via a container ship—which is the most cost effective and time sensitive approach to transport the deployment system to the intended survey destination and/or supply vessel—it must be located in one or more ISO certified containers. However, existing deployment systems cannot be entirely transferred via ISO certified containers. Most node deployment systems use large, specially made deployment equipment, machines, winches, and modules/containers that cannot fit on standard container ships (i.e., they are not located within ISO certified containers). Even if some of the components could be shipped via a container ship, the mobilization/installation of a deployment system on a supply vessel is dependent upon the components that take the longest time to get to the supply vessel.

What is needed is a node deployment and retrieval system that is fully autonomous and may be stored, transported, and operated in a cost effective and time sensitive manner. A system is needed that can fully transport, store, and operate all of such a system in CSC approved ISO containers that can be transported via standard shipping routes and mobilized on a suitable vessel. A deployment system is needed that can be easily and quickly installed and/or mobilized on any number of readily available marine vessels.

The disclosed node deployment and retrieval system utilizes CSC approved ISO containers to house all of the necessary deployment/retrieval components for storage, transport, and use on the back deck of a standard marine vessel. No other commercial system utilizes such an approach. Such a system is safer and saves significant money and time for each seismic survey operation.

SUMMARY OF THE INVENTION

In one embodiment, methods, apparatuses, and systems are disclosed for a node deployment system entirely contained in a plurality of CSC approved ISO containers. Each of the components of the deployment system may be located in a CSC approved ISO container for storage, operation, and transport.

In one embodiment, a node handling system comprises a deployment system and a node storage and service system fully contained within a plurality of CSC approved ISO containers. The node deployment system is configured to retrieve and deploy autonomous seismic nodes from the back deck of a vessel. The node storage and service system is configured to transfer nodes to and from the node deployment system for storage and servicing.

In one embodiment, a containerized deck handling system for a plurality of autonomous seismic nodes comprises a plurality of autonomous seismic nodes, a node deployment system configured to deploy and retrieve the plurality of autonomous seismic nodes from the back deck of the marine vessel, and a node storage and service system, configured to store, handle, and service the plurality of autonomous seismic nodes, wherein the node storage and service system and the node deployment system are both located in a plurality of CSC approved ISO containers.

In another embodiment, a containerized deployment and retrieval system for a plurality of autonomous seismic nodes comprises a plurality of autonomous seismic nodes, a plurality of CSC approved ISO containers, a deployment system entirely located within the plurality of CSC approved ISO containers, and a winch system located in a first container of the plurality of CSC approved ISO containers.

In one embodiment, the disclosed node handling system is configured to transport to a remote destination without any specially made cargo vessels. Thus, the system is configured to ship based on standard shipping vessels that require CSC approved ISO containers. The node handling system may also be operated from a marine vessel entirely within a plurality of CSC approved ISO containers.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Node Deployment

Figure 1A:
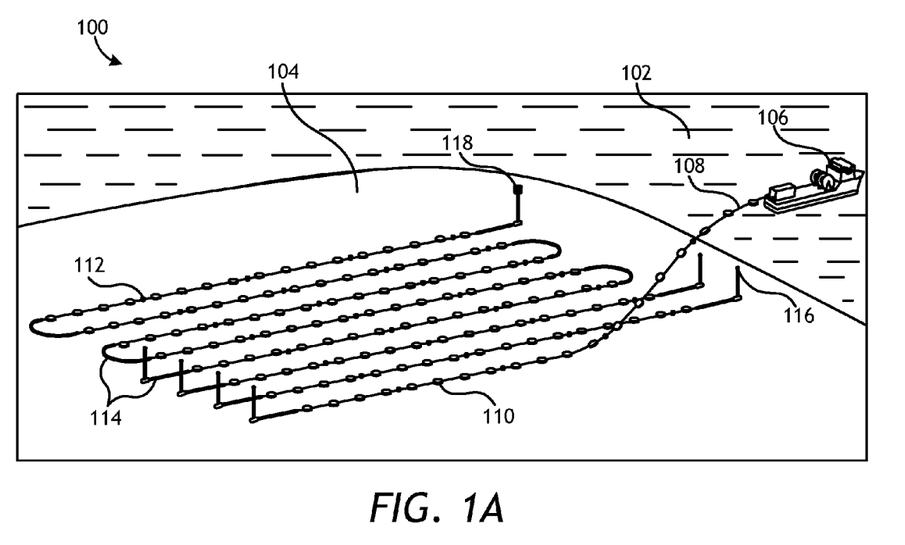
FIG. 1A is a schematic diagram illustrating one embodiment of a system for marine deployment of an autonomous seismic node.
Figure 1B:
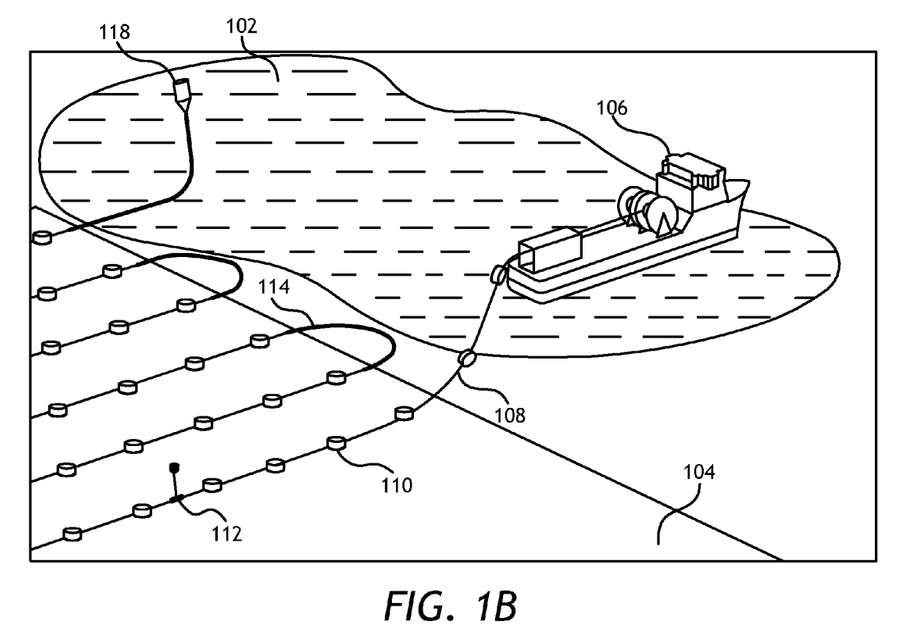
FIG. 1B is a schematic diagram illustrating one embodiment of a system for marine deployment of an autonomous seismic node.

FIGS. 1A and 1B illustrate a layout of a seabed seismic recorder system that may be used with autonomous seismic nodes for marine deployment. FIG. 1A is a diagram illustrating one embodiment of a marine deployment system 100 for marine deployment of seismic nodes 110. One or more marine vessels deploy and recover a cable (or rope) with attached sensor nodes according to a particular survey pattern. In an embodiment, the system includes a marine vessel 106 designed to float on a surface 102 of a body of water, which may be a river, lake, ocean, or any other body of water. The marine vessel 106 may deploy the seismic nodes 110 in the body of water or on the floor 104 of the body of water, such as a seabed. In an embodiment, the marine vessel 106 may include one or more deployment lines 108. One or more seismic nodes 110 may be attached directly to the deployment line 108. Additionally, the marine deployment system 100 may include one or more acoustic positioning transponders 112, one or more weights 114, one or more pop up buoys 116, and one or more surface buoys 118. As is standard in the art, weights 114 can be used at various positions of the cable to facilitate the lowering and positioning of the cable, and surface buoys 118 or pop up buoys 116 may be used on the cable to locate, retrieve, and/or raise various portions of the cable. Acoustic positioning transponders 112 may also be used selectively on various portions of the cable to determine the positions of the cable/sensors during deployment and post deployment. The acoustic positioning transponders 112 may transmit on request an acoustic signal to the marine vessel for indicating the positioning of seismic nodes 110 on sea floor 104. In an embodiment, weights 114 may be coupled to deployment line 108 and be arranged to keep the seismic nodes 110 in a specific position relative to sea floor 104 at various points, such as during start, stop, and snaking of deployment line 108.

FIG. 1B is a close-up view illustrating one embodiment of a system 100 for marine deployment of seismic nodes 110. In an embodiment, the deployment line 108 may be a metal cable (steel, galvanized steel, or stainless steel). Alternatively, the deployment line 108 may include chain linkage, rope (polymer), wire, or any other suitable material for tethering to the marine vessel 106 and deploying one or more seismic nodes 110. In an embodiment, the deployment line 108 and the seismic nodes 110 may be stored on the marine vessel 106. For example, the deployment line may be stored on a spool or reel or winch. The seismic nodes 110 may be stored in one or more storage containers. One of ordinary skill may recognize alternative methods for storing and deploying the deployment line 108 and the seismic nodes 110.

In one embodiment, the deployment line 108 and seismic nodes 110 are stored on marine vessel 106 and deployed from a back deck of the vessel 106, although other deployment locations from the vessel can be used. As is well known in the art, a deployment line 108, such as a rope or cable, with a weight attached to its free end is dropped from the back deck of the vessel. The seismic nodes 110 are preferably directly attached in-line to the deployment line 108 at a regular, variable, or selectable interval (such as 25 meters) while the deployment line 108 is lowered through the water column and draped linearly or at varied spacing onto the seabed. During recovery each seismic node 110 may be clipped off the deployment line 108 as it reaches deck level of the vessel 106. Preferably, nodes 110 are attached directly onto the deployment line 108 in an automated process using node attachment or coupling machines on board the deck of the marine vessel 106 at one or more workstations or containers. Likewise, a node detaching or decoupling machine is configured to detach or otherwise disengage the seismic nodes 110 from the deployment line 108, and in some instances may use a detachment tool for such detaching. Alternatively, seismic nodes 110 can be attached via manual or semi-automatic methods. The seismic nodes 110 can be attached to the deployment line 108 in a variety of configurations, which allows for free rotation with self-righting capability of the seismic node 110 about the deployment line 108 and allows for minimal axial movement on deployment line 108 (relative to the acoustic wave length). For example, the deployment line 108 can be attached to the top, side, or center of seismic node 110 via a variety of configurations.

Once the deployment line 108 and the seismic nodes 110 are deployed on the sea floor 104, a seismic survey can be performed. One or more marine vessels 106 may contain a seismic energy source (not shown) and transmit acoustic signals to the sea floor 104 for data acquisition by the seismic nodes 110. Embodiments of the system 100 may be deployed in both coastal and offshore waters in various depths of water. For example, the system may be deployed in a few meters of water or in up to several thousand meters of water. In some configurations surface buoy 118 or pop up buoy 116 may be retrieved by marine vessel 106 when the seismic nodes 110 are to be retrieved from the sea floor 104. Thus, the system 110 may not require retrieval by means of a submersible or diver. Rather, pop up buoy 116 or surface buoy 118 may be picked up on the surface 102 and deployment line 108 may be retrieved along with seismic nodes 110.

Autonomous Seismic Node Design

Figure 2A:
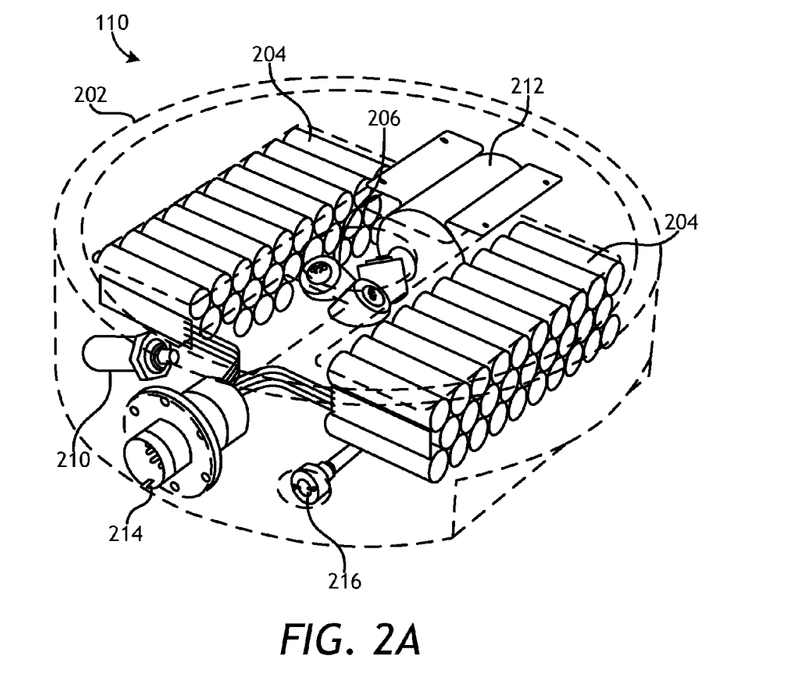
FIG. 2A illustrates a perspective view diagram of one embodiment of an autonomous seismic node.

FIG. 2A illustrates a perspective view diagram of an autonomous ocean bottom seismic node 110. The seismic node 110 may include a body 202, such as a housing, frame, skeleton, or shell, which may be easily dissembled into various components. Additionally, the seismic node 110 may include one or more battery cells 204. In an embodiment, the battery cells 204 may be lithium-ion battery cells or rechargeable battery packs for an extended endurance (such as 90 days) on the seabed, but one of ordinary skill will recognize that a variety of alternative battery cell types or configurations may also be used. Additionally, the seismic node may include a pressure release valve 216 configured to release unwanted pressure from the seismic node 110 at a pre-set level. The valve protects against fault conditions like water intrusion and outgassing from a battery package. Additionally, the seismic node may include an electrical connector 214 configured to allow external access to information stored by internal electrical components, data communication, and power transfer. During the deployment the connector is covered by a pressure proof watertight cap 218 (shown in FIG. 2B). In other embodiments, the node does not have an external connector and data is transferred to and from the node wirelessly, such as via electromagnetic or optical links.

In an embodiment, the internal electrical components may include one or more hydrophones 210, one or more (preferably three) geophones 206 or accelerometers, and a data recorder 212. In an embodiment, the data recorder 212 may be a digital autonomous recorder configured to store digital data generated by the sensors or data receivers, such as hydrophone 210 and the one or more geophones or accelerometers 206. One of ordinary skill will recognize that more or fewer components may be included in the seismic node 110. For example, there are a variety of sensors that can be incorporated into the node including and not exclusively, inclinometers, rotation sensors, translation sensors, heading sensors, and magnetometers. Except for the hydrophone, these components are preferably contained within the node housing that is resistant to temperatures and pressures at the bottom of the ocean, as is well known in the art.

Figure 2B:
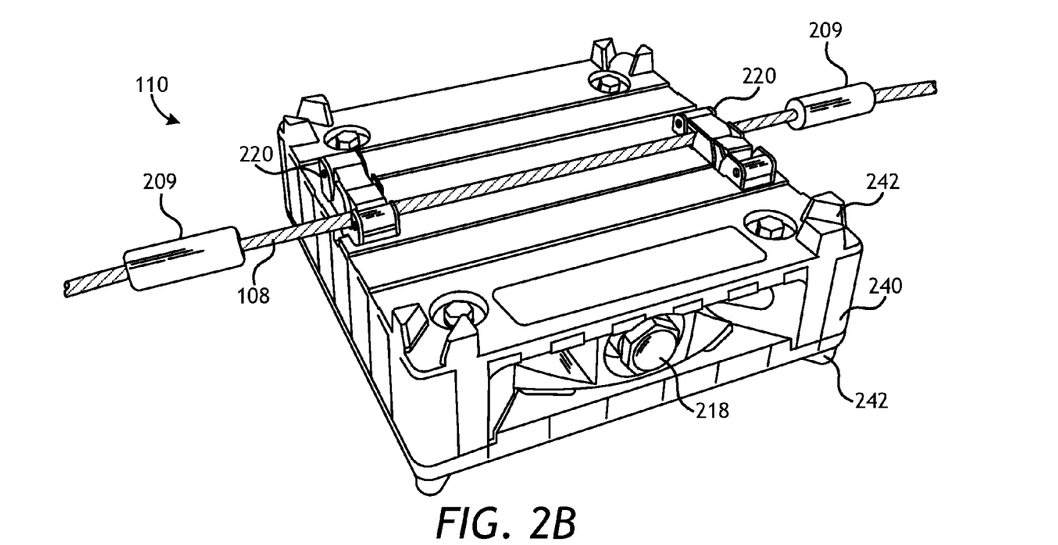
FIG. 2B illustrates a perspective view diagram of another embodiment of an autonomous seismic node.

While the node in FIG. 2A is circular in shape, the node can be any variety of geometric configurations, including square, rectangular, hexagonal, octagonal, cylindrical, and spherical, among other designs, and may or may not be symmetrical about its central axis. In one embodiment, the node consists of a watertight, sealed case or pressure housing that contains all of the node's internal components. In another embodiment, the pressurizing node housing is partially and/or substantially surrounded by a non-pressurized node housing that provides the exterior shape, dimensions, and boundaries of the node. In one embodiment, the node is square or substantially square shaped so as to be substantially a quadrilateral, as shown in FIG. 2B. One of skill in the art will recognize that such a node is not a two-dimensional object, but includes a height, and in one embodiment may be considered a box, cube, elongated cube, or cuboid. While the node may be geometrically symmetrical about its central axis, symmetry is not a requirement. Further, the individual components of the node may not be symmetrical, but the combination of the various components (such as the pressurized housing and the non-pressurized housing) provide an overall mass and buoyancy symmetry to the node. In one embodiment, the node is approximately 350 mm×350 mm wide/deep with a height of approximately 150 mm. In one embodiment, the body 202 of the node has a height of approximately 100 mm and other coupling features, such as node locks 220 or protrusions 242, may provide an additional 20-50 mm or more height to the node.

In another embodiment, as shown in FIG. 2B, the node's pressure housing may be coupled to and/or substantially surrounded by an external non-pressurized node housing 240. Various portions of non-pressurized node housing 240 may be open and expose the pressurized node housing as needed, such as for hydrophone 210, node locks 220, and data/power transfer connection 214 (shown with a fitted pressure cap 218 in FIG. 2B). In one embodiment, the upper and lower portions of the housing include a plurality of gripping teeth or protrusions 242 for engaging the seabed and for general storage and handling needs. Non-pressurized node housing 240 provides many functions, such as protecting the node from shocks and rough treatment, coupling the node to the seabed for better readings (such as low distortion and/or high fidelity readings) and stability on the seabed, and assisting in the stackability, storing, alignment, and handling of the nodes. Each node housing may be made of a durable material such as rubber, plastic, carbon fiber, or metal, and in one embodiment may be made of polyurethane or polyethylene. In still other embodiments, the seismic node 110 may include a protective shell or bumper configured to protect the body.

In one embodiment, the seismic node 110 comprises one or more direct attachment mechanisms and/or node locks 220 that may be configured to directly attach the seismic node 110 to a deployment line 108. This may be referred to as direct or in-line node coupling. In one embodiment, the attachment mechanism 220 comprises a locking mechanism to help secure or retain the deployment line 108 to the seismic node 110. A plurality of direct attachment mechanisms may be located on any surfaces of the node 110 or node housing 240. In one embodiment, a plurality of node locks 220 is positioned substantially in the center and/or middle of a surface of a node or node housing. The node locks may attach directly to the pressure housing and extend through the node housing 240. In this embodiment, a deployment line, when coupled to the plurality of node locks, is substantially coupled to the seismic node on its center axis. In some embodiments, the node locks may be offset or partially offset from the center axis of the node, which may aid the self-righting, balance, and/or handling of the node during deployment and retrieval. The node locks 220 are configured to attach, couple, and/or engage a portion of the deployment line to the node. Thus, a plurality of node locks 220 operates to couple a plurality of portions of the deployment line to the node. The node locks are configured to keep the deployment line fastened to the node during a seismic survey, such as during deployment from a vessel until the node reaches the seabed, during recording of seismic data while on the seabed, and during retrieval of the node from the seabed to a recovery vessel. The disclosed attachment mechanism 220 may be moved from an open and/or unlocked position to a closed and/or locked position via autonomous, semi-autonomous, or manual methods. In one embodiment, the components of node lock 220 are made of titanium, stainless steel, aluminum, marine bronze, and/or other substantially inert and non-corrosive materials, including polymer parts.

While the node locks in this disclosure are described in the context of autonomous seismic nodes, direct attachment mechanisms and/or node locks 220 may be coupled directly to any device (such as a transponder or weight) or even a coupling case surrounding the device. Thus, the described node attachment/detachment system may be used to attach and detach a plurality of different devices, tools, and/or instruments in a similar manner to a deployment cable as to a node.

Containerized System

As mentioned above, the disclosed node deployment and retrieval system utilizes standard sized shipping containers to house all of the necessary deployment/retrieval components for storage, transportation, and use on the back deck of a supply vessel. The shipping containers are CSC approved ISO containers so that the deployment system (or parts thereof) can be entirely transported anywhere around the world on standard container ships. No other commercial system utilizes such an approach.

The disclosed system is safer and saves significant money and time for each seismic survey operation as opposed to conventional node deployment systems. For example, there is no need to separately install any of the deployment devices and equipment directly to the vessel. Instead, only the containers must be fastened and/or secured to the vessel. For ISO approved containers, the fastening process is standardized and may take only a few days to install the system to a vessel as opposed to weeks or months of installation time for a typical node deployment system. As another example, because ISO certified containers are utilized, the containers can be transported via any standard shipping route, such as air, road, train, or sea, to a destination harbor and mobilized on a suitable marine vessel. In one embodiment the marine vessel may be any vessel of opportunity. Further, such a system can be transported to any remote destination in the world in a matter of a few days, in contrast to a conventional node deployment system that may take weeks or months to ship to a remote destination. The ability to transport the entire system in a fast and efficient manner provides numerous advantages, such as being safer to transport and install, decreasing the lead time needed to find and engage a suitable transportation vessel as well as marine deployment vessel (which often may take months in advance with current deployment systems), and being significantly more cost effective to transport (both in time and money) than conventional node deployment systems. As to other benefits besides transportation, such a fully containerized solutions protects operators from being exposed to harsh weather conditions (thereby increasing their safety) and facilitates operations of the handling system and survey in harsher conditions than previously possible. A containerized system allows crews and equipment to be efficiently managed and shared without substantial cost, including combining crews and equipment to meet the demands of extremely large seismic surveys.

In one embodiment, the contents of each container may be modified for the particular task of the container, such as node storage, node servicing, node cleaning, line deployment/retrieval, line tensioning, node attaching/detaching, etc. The containers may be transferred to the deck of a vessel via a crane or other lifting device and then secured to the deck and coupled to each other through various fastening mechanisms. The containers may be positioned side to side, end to end, and even on top of each other (up to 3 or 4 levels high) on the deck depending on the specific layout of the containers, need of the survey, and requirements of the vessel. The system setup may vary from job to job and from vessel to vessel, in both layout and number of containers utilized. One embodiment of the node deployment system uses standard sized CSC approved ISO containers in a plurality of configurations for efficient deployment of the nodes. Standard sized containers are typically 20 or 40 feet long and 8 feet wide, and may be 8 feet, 6 inches tall for standard height containers to 9 feet, 6 inches tall for high-cube containers. Each container preferably has a floor, roof, and sidewalls, with various portions removed to facilitate transfer of nodes to, from, and within each container as needed, or to allow service personnel access to the container. These containers may include additional frame supports to the floor and/or sides, but would be CSC approved ISO containers.

While some existing node deployment systems are partially transported or contained within one or more modules/containers, these are typically huge, oversized modules and the entire deployment systems cannot be installed in ISO certified containers. The fact that the entire system cannot be transported via ISO certified containers and container ships causes significant issues, as more detailed in the Background section above. For example, even if some of the node deployment system can be transported via container ships, other portions of the system encounter serious transportation and installation issues, which causes the entire node deployment system to be limited by such non-standardized shipping components. Likewise, even if some portions of the node deployment system can be operated on the back deck of a vessel, the portions that must be installed separately on the back deck causes significant installation time for the entire system and may require specially designed and/or re-built vessels. Thus, the fact that the entire disclosed deployment system can be fully transported within CSC approved ISO containers and stored and operated in these standard containers on a marine vessel is a novel aspect of the disclosed system and provides significant benefits.

No other commercial system utilizes such an approach as disclosed herein. Such a fully containerized system requires significant design considerations of all aspects of the node deployment, retrieval, storage, and handling aspects. Each separate aspect/component of the deployment system depends upon and is integrated with the other aspects/components of the deployment system. For example, the node design itself affects how the node is attached and detached from the cable, how it may be deployed and retrieved from the back deck of a vessel, and how it may be stored, serviced, and handled on the vessel. A fully ISO certified containerized system requires a comprehensive and integrated node deployment system that is specifically configured to be transported, stored, and operated out of a plurality of standardized shipping containers.

Node Handling Systems

As mentioned above, to perform a marine seismic survey that utilizes autonomous seismic nodes, those nodes must be deployed and retrieved from a vessel, typically a surface vessel. In one embodiment, one or more node storage and service systems is coupled to one or more deployment systems. Together they may be generically or collectively referred to as a node handling system. The node storage and service system is configured to handle, store, and service the nodes before and after the deployment and retrieval operations performed by a node deployment system. Such a node storage and service system is described in more detail in U.S. patent application Ser. No. 14/711,262, filed on May 13, 2015, incorporated herein by reference. The node deployment system is configured to attach and detach a plurality of nodes to a deployment cable or rope and for the deployment and retrieval of the cable into the water. Details on a node installation system and an overboard unit system of a node deployment system are described in more detail in U.S. patent application Ser. Nos. 14/820,285 and 14/820,306, both filed on Aug. 6, 2015, both of which are incorporated herein by reference.

Figure 3:
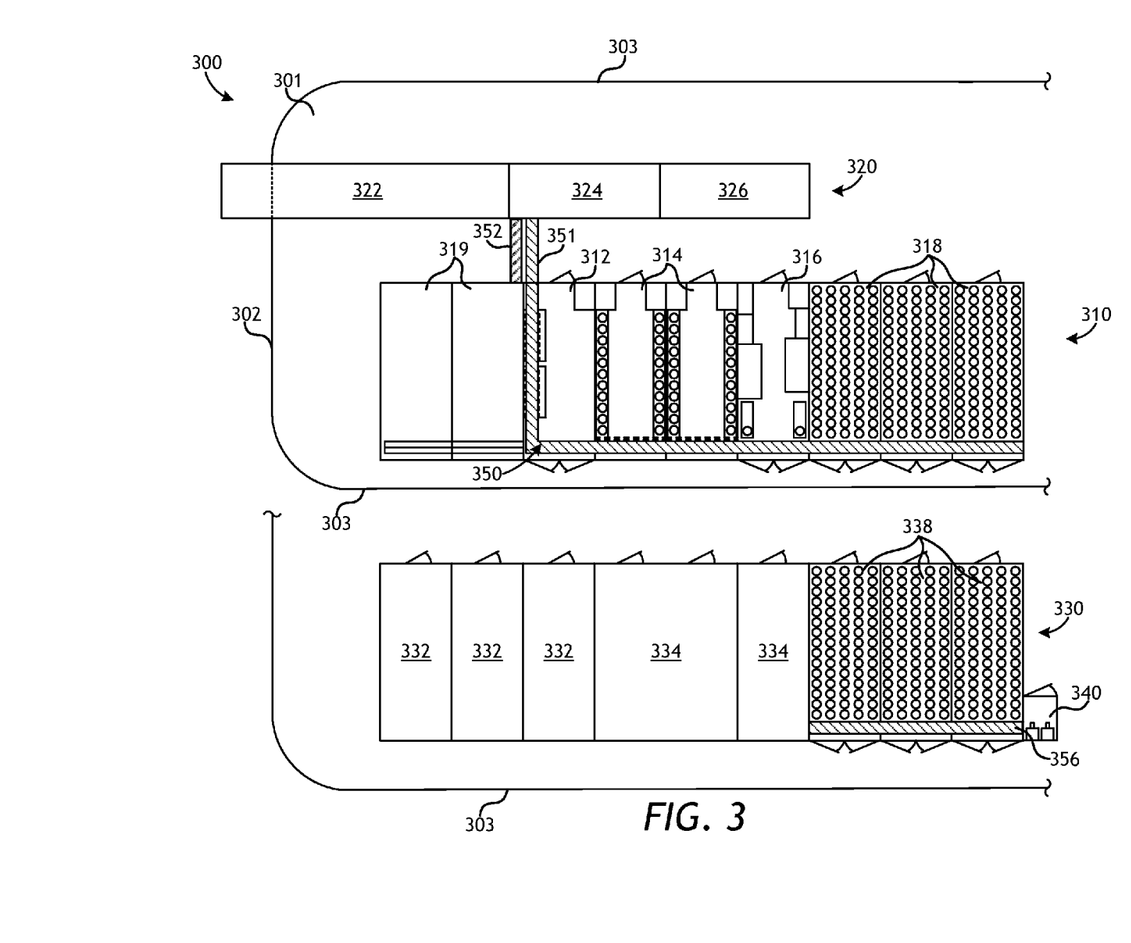
FIG. 3 is a schematic diagram illustrating one embodiment of a node handling system on the back deck of a marine vessel.

FIG. 3 illustrates a schematic of one embodiment of node handling system 300 of a surface vessel. While a node handling system may be located on any portion of the vessel, in one embodiment it is located on the back deck of a marine vessel. Of relevance to FIG. 3, vessel 301 comprises a back, end, or aft section 302 and two sides 303. For convenience purposes, the rest of the marine vessel is not shown in FIG. 3. As shown, each of the components of node handling system 300 is located in one or more CSC approved ISO containers that may be placed on the back deck of vessel 301. Thus, node handling system 300 may be characterized as a fully ISO containerized node deployment and retrieval system for a plurality of autonomous seismic nodes. Node handling system 300 may operate in automatic, semi-automatic, or manual processes. A partially or entirely automated system reduces man-power requirements for deployment, retrieval, storage, service, and other handling operations and increase overall safety, efficiency, and reliability of the seismic survey.

In one embodiment, node handling system 300 comprises node deployment system 320 and node storage and service system 310. In one embodiment, node storage and service system 310 comprises a first plurality of containers located on a lower deck and a second plurality of containers 330 on a upper deck. Collectively, the first and second plurality of containers may be generically referred to as node storage and service system 310. Node storage and service system 310 is configured to handle and store the nodes before and after the deployment and retrieval operations performed by node deployment system 320. Node storage and service system 310 is configured such that each operational task is located within a container. In one embodiment, each container has separate control systems for local and/or remote operation of the tasks performed in the container. With this container-based system, the addition and/or removal of service and storage containers based on the particular survey and/or vessel requirements is straightforward. In one embodiment, as shown in FIG. 3, each container of node storage and service system 310 is placed side by side on the back deck of vessel 301. In contrast, one or more of the containers of node deployment system 320 may be placed end to end, such that the length of each container is longitudinal to the path of cable deployment and retrieval. In this configuration, the containers of the node handling system are substantially perpendicular to the length of the vessel and the containers of the node deployment system are substantially parallel to the length of the vessel. As shown in FIG. 3, some or all of the containers may have doors on the front and/or back portions of the containers for access and/or entry by personnel.

In one embodiment, node storage and service system 310 consists of a plurality of CSC approved ISO containers, including cleaning container 312, charging/downloading containers 314, service/maintenance container 316, storage containers 318, and auxiliary containers 319, which are interconnected by conveyor or transport system 350. In one embodiment, transport system 350 comprises a conveyor section 351 that couples deployment system 320 to node storage and service system 310 and conveyor section 352 that is configured to transfer auxiliary equipment (such as weights and transponders) between the deployment system and the node storage and service system. During mobilization on the vessel, conveyors 351, 352 may be easily removed from one of the containers and coupled to the node deployment system 320 and node storage and service system 310. Conveyor system 350 may also include one or more transport systems in one or more of the plurality of containers to transport the nodes within an individual container. Conveyor system 350 may also include numerous types of conveyor sub-systems, such as conveyor systems that rotate an individual node in a plurality of directions, conveyor systems that move the node to a different height and/or elevation, and conveyor systems that merely transport the node horizontally. Details on such a transfer/conveyor system is described in more detail in U.S. patent application Ser. No. 14/711,262, filed on May 13, 2015, incorporated herein by reference.

As mentioned above, for some vessels or surveys, multiple decks or levels of containers may be used in node handling system 300. FIG. 3 illustrates one layout of an upper or top deck of node storage and service system 310 according to one embodiment. This structure largely follows the configuration of the lower deck on node storage and service system 310, and in one embodiment, each of the lower and upper deck systems comprise nine containers (for a total of 18 containers). In general, the upper deck node system includes a second plurality of containers 330 that sit directly on top of a first plurality of containers on the lower deck. The second plurality of containers of node storage and service system 310 may include additional node storage containers 338 for additional node capacity, general equipment storage containers 332, and a plurality of containers 334 for communication, operating, instrument, and navigation data processing systems. Alternatively, one or more of these containers can be made into an instrument room or office area, with the appropriate stairs (inside or outside of the containers) connecting the first and second decks. In one embodiment, second level storage containers 338 are placed directly above and/or on top of first level storage containers 318. An elevator mechanism 340 can be used to transfer nodes from the first deck to the second deck, and a conveyor system 356 may be used to transfer nodes between elevator mechanism 340 and second level storage containers 338. Alternatively, each storage container may include an elevator or vertical conveyor belt or mechanism for transferring the nodes from a lower to upper deck node storage container. In one embodiment, each storage container 338 and the transport systems therein on the second deck is substantially similar to the storage containers 318 and the transport systems therein on the first deck.

As shown in FIG. 3, an autonomous seismic node deployment system may include a plurality of containers, with separate containers containing one or more winches in container 326, one or more node installation devices in container 324, and one or more overboard units in container 322, and other devices and/or systems to facilitate deployment and/or retrieval of a plurality of autonomous seismic nodes from the water before and after the nodes are used in a seismic survey. In one embodiment, node deployment system 320 is configured to attach and detach a plurality of nodes 110 to a deployment cable or rope 108 and for the deployment and retrieval of the cable into the water. In an alternative embodiment, the marine vessel includes two such node deployment systems, with the second system being either a backup or used simultaneously as the first system. In one embodiment, node deployment system 320 receives nodes from node storage and service system 310 at node installation container 324. In one embodiment, overboard unit container 322 facilitates deployment and retrieval of the deployment line with the coupled nodes, and may contain one or more overboard wheels at least partially if not entirely extending off of a back portion of the marine vessel, as described more fully in U.S. patent application Ser. No. 14/820,285, filed on Aug. 6, 2015.

In a first or deployment mode, node deployment system 320 is configured to receive nodes from node storage and service system 310, to couple those nodes to a deployment line, and to deploy those nodes into a body of water. In a second or retrieval mode, node deployment system 320 is configured to retrieve nodes from a body of water, de-couple those nodes from a deployment line, and to transfer those nodes to node storage and service system 310. Thus, node deployment system 320 may also be characterized as a node retrieval system in some situations. In one embodiment, the deployment line is stopped in the correct position and the seismic node is manually attached to the deployment line, and in another embodiment the seismic node is accelerated to match the deployment speed of the deployment line and automatically attached to the deployment line. At the same time, via an automatic, semi-automatic, or manual process, auxiliary equipment (such as weights or transponders) may also be attached to the deployment line at selected intervals. In one embodiment, transponders, weights, and other seismic and non-seismic devices may be directly attached to the deployment cable by coupling one or more node locks to the device and/or to a housing surrounding the device. The node deployment system is also configured to deploy and retrieve a deployment line or cable into and from a body of water. The deployment line and/or cable system may be continuously laid down on the seabed, but in some instances it can be separated and buoyed off at select intervals to cope with obstacles in the water or as required by spread limitations for a particular survey. Any one or more of these steps may be performed via automatic, semi-automatic, or manual methods. In one embodiment, each node is coupled to and/or integrated with a node lock, as described in more detail in U.S. patent application Ser. No. 14/736,926, filed on Jun. 11, 2015, incorporated herein by reference. The node locks (and attached nodes) may be coupled to and decoupled from the deployment line via node deployment system 320.

In one embodiment, node deployment system 320 may comprise one or more control systems, which may comprise or be coupled to a control system located in each container. In one embodiment an operator may be located inside one or more of the containers, or even in a remote location such as off of the vessel, and operate the entire node deployment system. In other embodiments, the control system can be operated from a surveillance cabin or by remote control on the deck or by both locations. In one embodiment, the control system may be designed for variable control tension on the deployment line and may interface various components and systems of node deployment system 320 (such as the winch, node installation machine, overboard unit, and outboard node detection unit) together for smooth operation during retrieval and deployment. Besides having slow start up and slow down sequences, the system may have quick stop options for emergency situations, which can be activated automatically or manually. In one embodiment, the control system can make various measurements at different portions of the deployment system, including tension on the cable, angle of the cable, and speed of the cable, and the like. In some embodiments, the control system continuously obtains and utilizes information about vessel roll, yaw, and pitch (speed and amplitude) and other factors (cable speed, tension, and deployed length) to ensure adequate movement and positioning of the overboard system and overboard wheel.

In still other embodiments, deployment system 320 (as well as node storage and service system 310) may include one or more node detection devices used to automatically identify and track nodes during various operations within the node handling system 300. In one embodiment, such a system includes a radio-frequency identification (RFID) system that shows and identifies a node passing by particular points in the deployment system by radio frequency, as well as other wireless non-contact devices and methods (such as optical detection sensors) that can identify tags and other identification devices coupled to nodes.

In operation, the node storage and service system may operate autonomously or semi-autonomously before and after the nodes have been deployed and/or retrieved from the ocean. The system can operate in a deployment mode (e.g., sending nodes to the node deployment system for deployment into the water) or storage mode (e.g., receiving nodes from the node deployment system for temporary or permanent storage). Likewise, node deployment system 320 may operate in automatic, semi-automatic, or manual processes. Such a partially or entirely automated system reduces manpower requirements for deployment and retrieval operations and increase overall safety, efficiency, and reliability of the seismic survey. Additionally, such embodiments may allow for operation in harsh climates.

Figure 4:
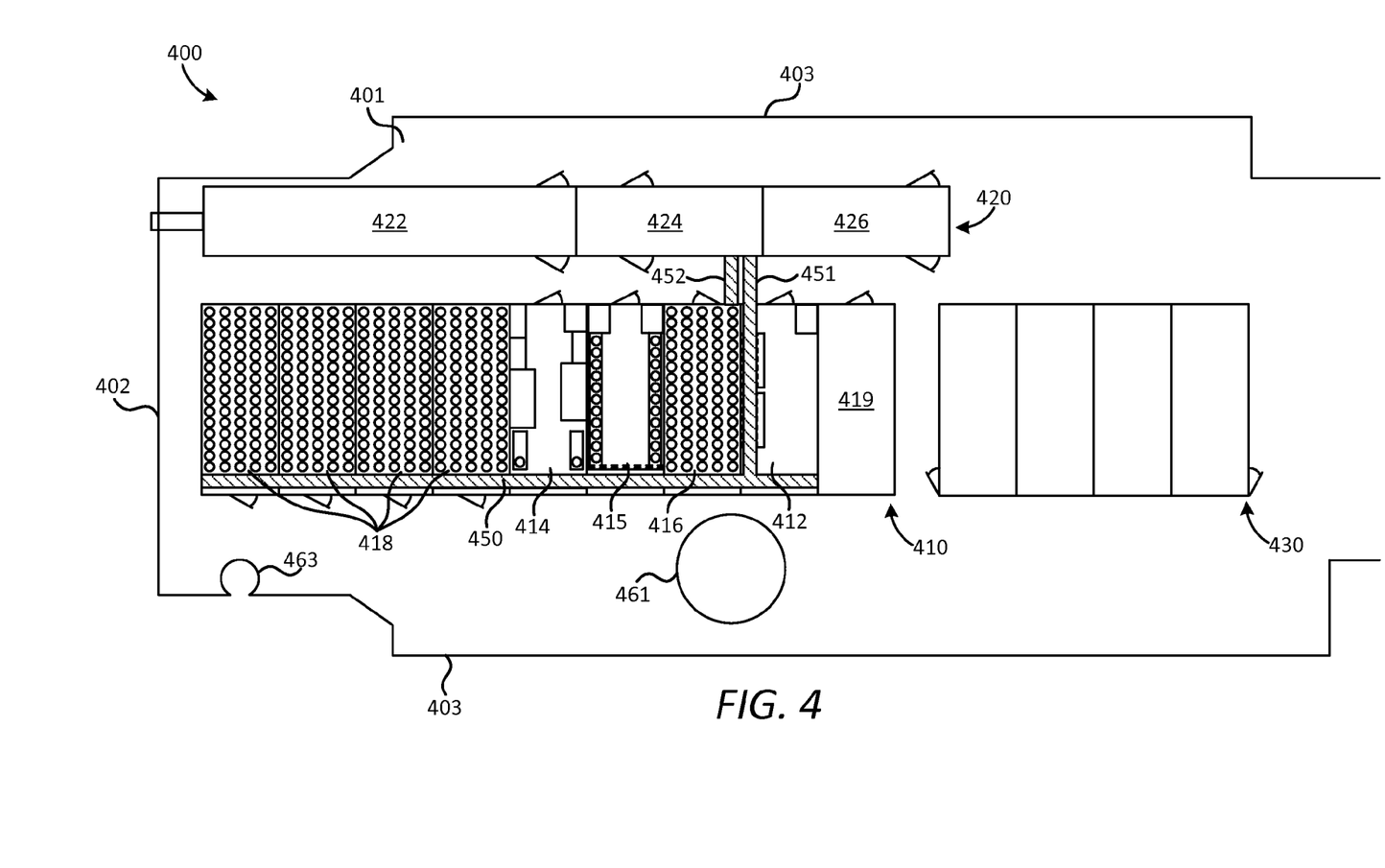
FIG. 4 is a schematic diagram illustrating another embodiment of a handling system on the back deck of a marine vessel.

FIG. 4 illustrates another embodiment of a layout of node handling system 400 on the back deck of a marine vessel 401. This other embodiment illustrates the versatility and customization of the container configuration of the disclosed node handling system, which may vary based upon survey or vessel requirements. The components of node handling system 400 are substantially similar to the components of node handling system 300, but the arrangement and quantity of the components is different. Like the containers in node handling system 300, each of the containers in node handling system 400 is a CSC approved ISO container. Node handling system 400 comprises node deployment system 420 and node storage and service system 410.

In one embodiment, node storage and service system 410 is coupled to a node deployment system 420, which in this case comprises overboard unit container 422, node installation container 424, and winch system container 426. Also shown on vessel 401 are optional crane locations 461, 463 on the back deck of a marine vessel, which may be found on various vessels, particularly larger marine vessels. Such cranes may be used for moving the plurality of containers of node handling system 400 to and on the vessel during mobilization and/or installation. Conventional deployment systems have significant difficulties during installation to avoid such structures on a vessel, such as cranes, doghouses, escape hatches, etc, and often require tremendous amounts of time to modify the vessels. In contrast, the disclosed system can easily be configured on a vessel without complicated modification of the vessel to avoid any vessel installed structures such as cranes 461, 463.

In some embodiments, node storage and service system 410 may comprise a first group of containers positioned apart and/or detached from a second group of containers 430. The first group of containers may be service and/or storage containers and the second group of containers 430 may be for control systems, navigation, processing, navigation, and personnel. In contrast to system 300 shown in FIG. 3, storage containers 418 are located near the aft portion of vessel 401. In one embodiment, four storage containers 418 are positioned adjacent to each other starting from near the stern of the vessel. Additional containers, in order from the back of the vessel, include a service container 414, a downloading/charging container 415, an additional fifth storage container 416 with a plurality of charged autonomous seismic nodes, a cleaning container 412, and a weight/transponder container 419. In one embodiment, each storage container holds approximately 1000 nodes, such that the node storage and service system 410 is configured to store approximately 5000 nodes with five storage containers. This volume of node storage and handling in a small footprint on a vessel is significantly greater than the volume required in conventional autonomous node deployment and retrieval operations. In one embodiment, node deployment system 420 and node storage and service system 410 are coupled by a plurality of conveyors 451, 452. In one embodiment, conveyor 451 may be configured to receive nodes from node deployment system 420 after they have been retrieved from the sea and direct the nodes to the cleaning container 412 for cleaning. Conveyor 452 may be configured to send nodes from storage container 416 to node deployment system 420. Nodes stored in storage container 416 may be fully charged and ready for deployment, and conveyor 452 allows node storage and service system 410 to more quickly transport nodes to node deployment system 420. Conveyor system 450 may be configured to transport nodes within and between the plurality of containers and may be substantially similar to conveyor system 350.

Figure 5A:
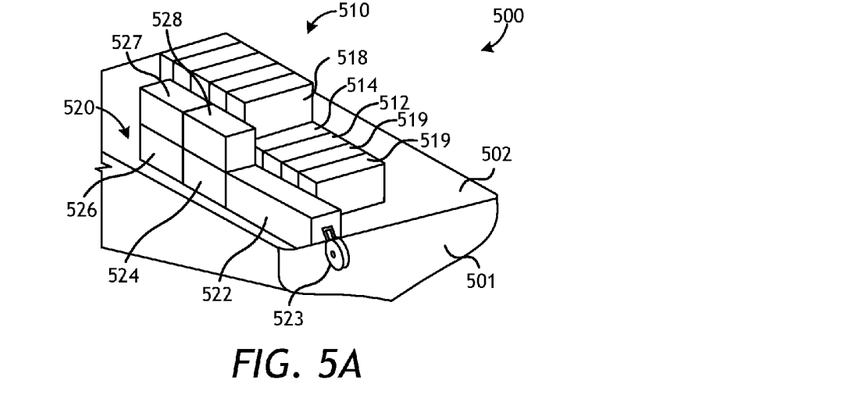
FIG. 5A illustrates a rear perspective view of one embodiment of a node handling system on the back deck of a marine vessel.
Figure 5B:
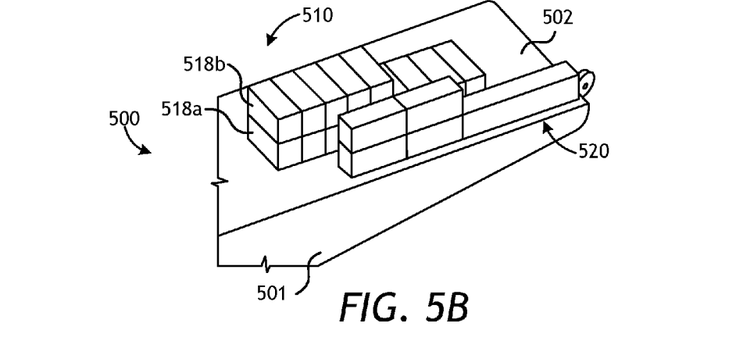
FIG. 5B illustrates a front perspective view of one embodiment of a node handling system on the back deck of a marine vessel.
Figure 5C:
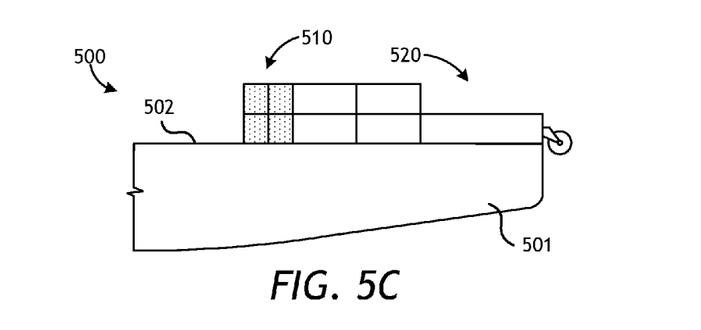
FIG. 5C illustrates a side view of one embodiment of a node handling system on the back deck of a marine vessel.

FIGS. 5A-5C illustrate a rear perspective, front perspective, and side view, respectively, of one embodiment of a node handling system 500 on back deck 502 of marine vessel 510. In one embodiment, system 500 is substantially the same node handling system illustrated in FIG. 4. Node handling system 500 comprises a node deployment system 520 and a node storage and service system 510. Each of the containers in node handling system 500 is a CSC approved ISO container. Node deployment system 520 may comprise a plurality of containers, such as overboard unit container 522, node installation container 524, and winch system container 526. In one embodiment, overboard unit 523 may be retracted in and out of overboard unit container 522 during deployment and retrieval operations. Node deployment system 520 may also comprise a second plurality of containers located on a first plurality of containers. For example, container 527 may comprise an additional winch system and container 528 may hold auxiliary equipment for the node deployment system.

Node storage and service system 510 may also comprise a plurality of containers. In one embodiment, node storage and service system 510 comprises a plurality of auxiliary equipment containers 519, a cleaning container 512, a downloading/charging container 514, a service container (not marked), and a plurality of storage containers 518. In one embodiment, storage containers may be located on a plurality of levels, such as first level storage container 518a and second level storage container 518b.

Figure 6:
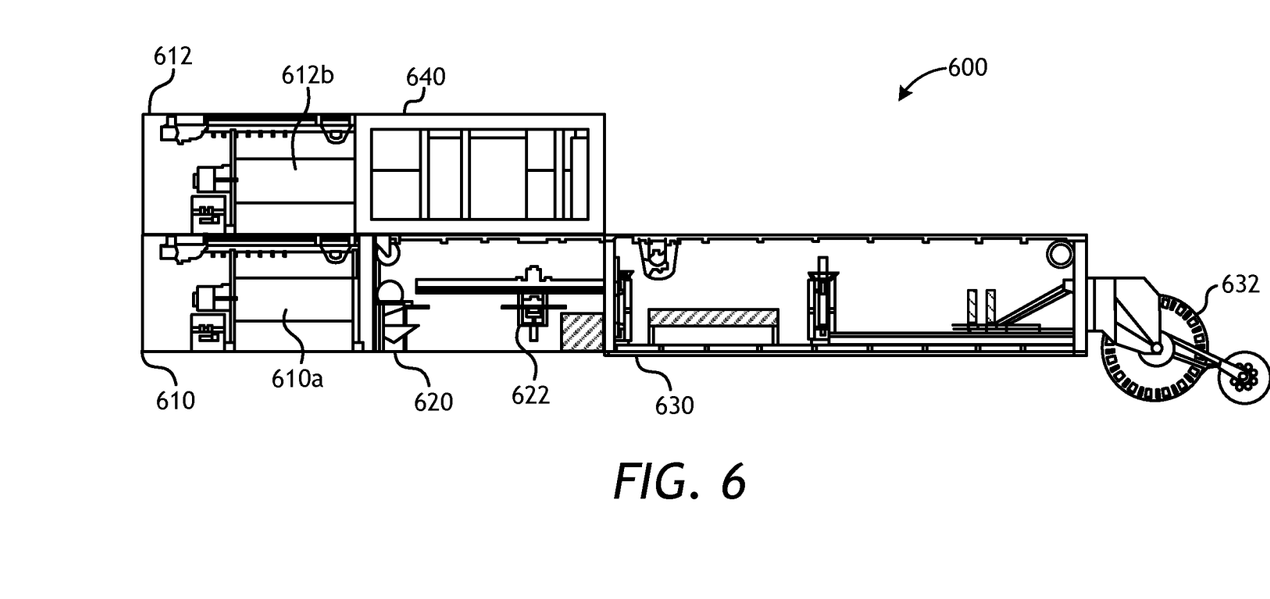
FIG. 6 illustrates a side view diagram of one embodiment of a node deployment system.

FIG. 6 illustrates a side view of one embodiment of deployment system 600. Similar to node deployment system 320 of FIG. 3, node deployment system 600 comprises a first container 610 configured to hold winch system 610a, a second container 620 configured to hold a node attaching/detaching system 622, and a third container 630 configured to hold an overboard unit 632 for retraction in and out of the container. In one embodiment, first container 610 and second container 620 are standard 20-foot long containers and third container 630 is a 40-foot long container. In some embodiments one or more tension control systems and a cleaning system may be utilized that may be located in one of the aforementioned containers, such as overboard unit container 630. Winch system 610a may be coupled to a cable spooling guide that is configured to deploy and retrieve cable from a spool of the winch system and route the cable to node installation container 620. Node attachment system 622 may be coupled to a node feed system, a node remover, and one or more sheaves, all of which may be contained within container 620. In one embodiment, a second deck or level of containers is utilized for additional components of node deployment system 600 and/or as back-up components. For example, in one embodiment, node deployment system 600 may comprise an additional winch system 612b located in second winch container 612 which sits upon first winch container 610, and an auxiliary equipment container 640 which sits upon node installation container 620. In some embodiments, portions of the deployment system may extend out over portions of the deck of the marine vessel. For example, a portion of overboard unit container 630 may extend beyond the back deck of a marine vessel. As another example, overboard unit 632 may be retractable into and out of overboard unit container 630 during transportation of the container and periods of non-use of the system.

Although the invention(s) is/are described herein with reference to specific embodiments, various modifications and changes can be made without departing from the scope of the present invention(s), as set forth in the claims below. For example, various configurations of the node handling system on the marine vessel are consistent with the disclosed embodiments herein. For example, for some vessels or surveys, only a lower deck may be used, while for other vessels or surveys both the lower and one or more upper decks (which includes extra containers) might be used. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A containerized deck handling system for the deployment and retrieval of a plurality of autonomous seismic nodes from a marine vessel, comprising:
   a plurality of autonomous seismic nodes, wherein each of the autonomous seismic nodes is configured to be coupled to a deployment cable, wherein the deployment cable is configured to be deployed from a marine vessel into a body of water, wherein each of the plurality of autonomous seismic nodes comprises at least one seismic sensor, at least one data recording unit, and at least one clock;
   a node deployment system located on a back deck of the marine vessel and configured to deploy and retrieve the plurality of autonomous seismic nodes from the back deck of the marine vessel, wherein the node deployment system is located in a first plurality of ISO containers located on the back deck of the marine vessel, wherein the node deployment system is configured to attach and remove the plurality of autonomous seismic nodes to and from the deployment cable within the first plurality of ISO containers;
   a node storage system located on the back deck of the marine vessel in a second plurality of ISO containers each of which comprises a plurality of side walls and configured to store the plurality of autonomous seismic nodes within the second plurality of ISO containers before attachment of the nodes to the deployment cable and after removal of the nodes from the deployment cable, and wherein the second plurality of ISO containers are arranged side by side; and
   a node transfer system located in each of the second plurality of ISO containers and configured to transfer the plurality of autonomous seismic nodes between each of the second plurality of ISO containers through at least one of the side walls of each of the second plurality of ISO containers,
   wherein the node deployment system and node storage system are configured to be operated from the marine vessel within the first plurality of ISO containers and the second plurality of ISO containers.

2. The system of claim 1, wherein the node deployment system comprises at least one winch system configured to deploy the deployment cable from the vessel into a body of water, wherein the winch system is located in a first container of the first plurality of ISO containers.

3. The system of claim 1, wherein the node deployment system comprises an overboard system configured to deploy the deployment cable from the back deck of the marine vessel into a body of water, wherein the overboard system is located in a third container of the first plurality of ISO containers, wherein the overboard system is configured to deploy the plurality of autonomous seismic nodes over the overboard system.

4. The system of claim 3, wherein the overboard system is automatically retractable to and from the third container.

5. The system of claim 1, wherein the first plurality of ISO containers comprises a lower plurality of containers and an upper plurality of containers located on top of the lower plurality of containers.

6. The system of claim 1, wherein the second plurality of ISO containers comprises a lower plurality of containers and an upper plurality of containers located on top of the lower plurality of containers, wherein an elevator mechanism is configured to travel between at least one of the lower plurality of containers and at least one of the upper plurality of containers carrying one or more of the plurality of autonomous seismic nodes.

7. The system of claim 1, wherein the plurality of autonomous seismic nodes is at least 1000 nodes.

8. The system of claim 1, wherein the plurality of autonomous seismic nodes is at least 5000 nodes.

9. The system of claim 1, wherein the marine vessel is any vessel of opportunity.

10. The system of claim 1, wherein the node deployment system located in the first plurality of containers and the node storage system located in the second plurality of containers are capable of being removed from the vessel and being shipped using a container ship.

11. The system of claim 1, wherein the node deployment system comprises at least one winch located in a first container of the first plurality of ISO containers and a node installation machine located in a second container of the first plurality of ISO containers and an overboard unit located in a third container of the first plurality of ISO containers, wherein the deployment cable is routed through the first container to the second container and through the second container to the third container.

12. The system of claim 1, wherein the second plurality of ISO containers comprises at least one container configured to download data from the plurality of autonomous seismic nodes that is separate from any containers of the second plurality of ISO containers configured to store the plurality of autonomous seismic nodes.

13. The system of claim 1, wherein the first plurality of ISO containers is located substantially longitudinal to the back deck of the vessel and the second plurality of ISO containers is located substantially perpendicular to the first plurality of ISO containers, wherein each of the first plurality of ISO containers is adjacent to at least one container of the first plurality of containers, and wherein each of the second plurality of ISO containers is adjacent to at least one container of the second plurality of containers.

14. The system of claim 1, wherein each of the second plurality of ISO containers is adjacent to another of the second plurality of ISO containers, and wherein the node transfer system is configured to transfer the plurality of autonomous seismic nodes between the second plurality of ISO containers during transit to the node deployment system while the plurality of autonomous seismic nodes are located within the second plurality of ISO containers.

15. The system of claim 1, further comprising a conveyor coupling at least one of the first plurality of ISO containers to at least one of the second plurality of ISO containers, wherein the conveyor is configured to transfer all of the plurality of autonomous seismic nodes located in the node storage system to and from the node deployment system.

16. A containerized deployment and retrieval system for a plurality of autonomous seismic nodes from a marine vessel, comprising:
 a plurality of autonomous seismic nodes, wherein each of the plurality of autonomous seismic nodes is configured to be coupled to a deployment cable, wherein each of the plurality of autonomous seismic nodes comprises at least one seismic sensor, at least one data recording unit, and at least one clock;
 a node deployment system for the plurality of autonomous seismic nodes located within a first plurality of ISO containers located on a back deck of a marine vessel and configured to deploy and retrieve the plurality of autonomous seismic nodes from the back deck of the marine vessel within the first plurality of ISO containers, wherein the node deployment system is configured to be operated from the marine vessel within the first plurality of ISO containers,
 wherein the node deployment system comprises at least one winch system configured to deploy the deployment cable from the marine vessel into a body of water, wherein the winch system is located in a first container of the first plurality of ISO containers,
 wherein the node deployment system comprises at least one node installation machine configured to attach and detach the plurality of autonomous seismic nodes to the deployment cable, wherein the node installation machine is located in a second container of the first plurality of ISO containers; and
 a second plurality of ISO containers located on the back deck of the marine vessel, wherein each of the second plurality of ISO containers is configured to store the plurality of autonomous seismic nodes before attachment of the nodes to the deployment cable and after removal of the nodes from the deployment cable, and wherein the second plurality of ISO containers are arranged side by side; and
 a node transfer system located in each of the second plurality of ISO containers and configured to transfer the plurality of autonomous seismic nodes between each of the second plurality of ISO containers during operation of the node deployment system.

17. The system of claim 16, wherein the node deployment system comprises an overboard system configured to deploy the deployment cable from the back deck of the marine vessel into a body of water, wherein the overboard system is located in a third container of the first plurality of ISO containers.

18. The system of claim 17, wherein the overboard system comprises one or more overboard wheels.

19. The system of claim 16, wherein the node deployment system is capable of being removed from the marine vessel and transported to a remote location entirely within the first plurality of ISO containers.

20. A containerized deck handling system for a plurality of autonomous seismic nodes, comprising:
 a plurality of autonomous seismic nodes, wherein each of the autonomous seismic nodes is configured to be coupled to a deployment cable, wherein the deployment cable is configured to be deployed from a marine vessel into a body of water;
 a node deployment system configured to deploy and retrieve the plurality of autonomous seismic nodes from a back deck of the marine vessel, wherein the node deployment system is located in a first group of one or more ISO containers located on the back deck of the marine vessel, wherein the node deployment system is configured to attach and remove the plurality of autonomous seismic nodes to and from the deployment cable;
 a node storage system configured to store the plurality of autonomous seismic nodes before attachment of the nodes to the deployment cable and after removal of the nodes from the deployment cable, wherein the node storage system is located in a second group of a plurality of ISO containers located on the back deck of the marine vessel, wherein each of the second group of ISO containers are arranged side by side and comprises a plurality of sidewalls; and
 a node transfer system located in each of the second group of ISO containers and configured to transfer the plurality of autonomous seismic nodes to and from the node deployment system and the node storage system, wherein the node transfer system is configured to transfer the plurality of autonomous seismic nodes between each of the second group of ISO containers through at least one of the side walls of each of the second group of ISO containers,
 and wherein the node deployment system and node storage system are configured to be operated from the marine vessel within the first group of one or more ISO containers and the second group of ISO containers.

* * * * *